Oct. 7, 1930.  F. HOLWECK  1,777,308
REFLECTING ELEMENT FOR OSCILLOGRAPHS
Filed Feb. 29, 1928
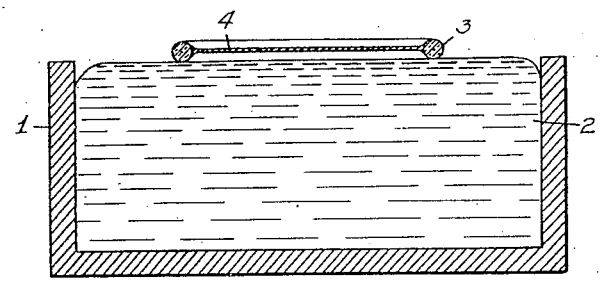
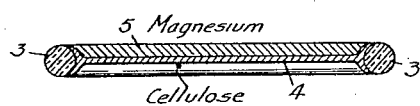
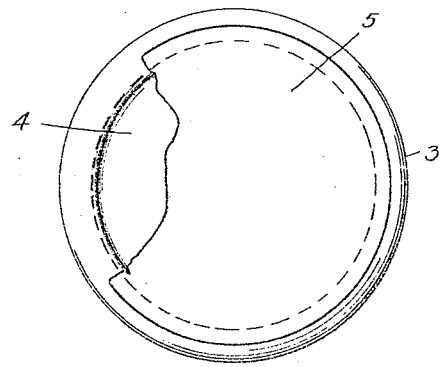
Fernand Holweck
INVENTOR
BY
ATTORNEY Patented Oct. 7, 1930

1,777,308

UNITED STATES PATENT OFFICE

FERNAND HOLWECK, OF PARIS, FRANCE, ASSIGNOR TO LES ETABLISSEMENTS EDOUARD BELIN, A CORPORATION OF FRANCE

REFLECTING ELEMENT FOR OSCILLOGRAPHS

Application filed February 29, 1928, Serial No. 258,102, and in France March 5, 1927.

My invention relates to improvements in oscillograph mirrors of a special type.

One of the objects of the invention is to provide a mirror of the character indicated which shall possess the qualities of rigidity, extensiveness and lightness much superior to devices of this character already known to the art.

More specifically an object of the invention is to provide as a new industrial product a cellulosic plate carried by a frame and provided with a metallic reflecting surface.

Another object of my invention is to provide a special process particularly suited to the manufacture of my improved mirrors.

A mirror constructed according to my invention may be given several square centimeters of reflecting surface and its weight still remain on the order of that of a film of air of 0.1 millimeters in thickness. Its use permits the study of much more delicate phenomena than heretofore in connection with oscillographs and the results of the deformation of the mirror, since it is not a question of displacement, are such that the device becomes particularly useful in connection with any of the apparatus employed in the television art where ultra-rapid phenomena is to be studied.

In this respect my improved mirror is particularly suitable for insertion in an electrostatic field whose variation is to be studied, the said mirror then forming the reflecting element of an ordinary oscillograph.

My invention will be more readily understood by those skilled in the art with reference to the accompanying drawing forming part of this specification and in which—

Fig. 1 is a diagrammatic sectional view illustrating the process by which my improved mirrors are produced;

Fig. 2 is a section through a mirror illustrating the structure of a mirror constructed according to my process; and Fig. 3 is a plan view of my novel mirror.

Referring to the drawing more in detail, and more particularly to Fig. 1 thereof, 1 indicates a suitable receptacle containing mercury 2. In forming a mirror, I pour a glass ring 3 on the surface of the mercury 2. I then pour a cellulosic material in solution, such as celluloid, into the ring thus formed, the cellulosic material being so light as to form a film which is suspended within the ring as the result of surface tension. Before setting of said material I slide the ring off the surface of the mercury, thereby capturing a film of cellulosic material supported by and at about the interior median line of the ring of glass 3.

During these operations mercury is employed as a support, first, because it is not attackable by the materials entering into the process, second, because it forms a convex meniscus which aids in sliding the ring from the surface of the vessel 1 without coming into contact therewith, and third, because there is no sticking.

The result is a ring of glass upon which is stretched a film of cellulosic material having a thickness which does not exceed 0.1 $\mu$, wherein $\mu$ is 1 micron or $\frac{1}{1000}$ millimeters.

The structure of the finished mirror is shown in section in Fig. 2 and comprises the glass ring 3, upon which is stretched a film of cellulosic material 4 covered with a thin coating of magnesium 5 as a reflecting surface. This magnesium is applied in a way which will now be described.

By volatilization thermically in a good vacuum, I am enabled to cover the said film with a reflecting deposit which is conductive, such as magnesium, for example.

Said film, tightly stretched by the action of evaporation, has a remarkable rigidity. To this is added the important effect of the resistance which the air offers to the vibration of the film at its natural period. But in a vacuum all the beneficial effects of rigidity and lightness of the said reflecting membrane is present. By placing the device in the vicinity of an electrostatic field with or without a continuous polarizing voltage, I obtain a highly luminous oscillograph of great rapidity.

My extra thin coating on a cellulosic material supported by a glass ring comprises a new industrial product which is particularly characterized by its rigidity, lightness and low inertia and when used in conjunction with an oscillograph of the character mentioned extraordinary qualities of rapidity and luminescent power are apparent. Such an instrument is particularly suited, as previously indicated, for the study or registering of ultra-rapid phenomena, and more particularly the phenomena of television apparatus. By displacing the luminous reflected focus point (diaphragming, for example) I obtain considerable variations in light and as the surface reflecting is extremely large (5 to 6 thousand times that of glass mirrors) I am able to maintain a modulation of considerable importance which the devices known to the art up to the present are incapable of anywhere near obtaining.

Having thus described my invention, what I claim as new and desire to secure by Letters Patent is:

1. A reflecting element for oscillographs comprising an annular supporting member of cast insulating material, a film of cellulosic material carried by said annular member and a reflecting coating of an electrical conducting substance covering said film.

2. A reflecting element for oscillographs comprising an annular glass ring, a film of cellulosic material carried by said ring and a reflecting coating of an electrical conducting substance covering said film.

3. A reflecting element for oscillographs comprising an annular supporting member of cast insulating material, a film of cellulosic material carried by said annular member and a thin coating of magnesium covering said film acting as a reflecting surface.

4. A reflecting element for oscillographs comprising an annular glass ring, a film of cellulosic material carried by said ring and a thin coating of magnesium covering said film acting as a reflecting surface.

5. A process of forming a reflecting element for oscillographs which comprises pouring a ring of insulating material on the surface of mercury, pouring a cellulosic solution into said ring to form a film of said solution therein, sliding said ring off said mercury without breaking said film and covering said film with a reflecting electrical conductive substance by treating said film in a vacuum.

6. A process of forming a reflecting element for oscillographs which comprises pouring a glass ring on the surface of mercury, pouring a cellulosic solution into said ring to form a film of said solution therein, sliding said ring off said mercury without breaking said film and covering said film with a reflecting electrical conductive substance by treating said film in a vacuum.

7. A process of forming a reflecting element for oscillographs which comprises pouring a ring of insulating material on the surface of mercury, pouring a cellulosic solution into said ring to form a film of said solution therein, sliding said ring off said mercury without breaking said film and covering said film with a thin coating of magnesium by placing said film in a vacuum and volatilizating said magnesium thermically therein to render said coating reflecting.

8. A process of forming a reflecting element for oscillographs which comprises pouring a glass ring on the surface of mercury, pouring a cellulosic solution into said ring to form a film of said solution therein, sliding said ring off said mercury without breaking said film and covering said film with a thin coating of magnesium by placing said film in a vacuum and volatilizating said magnesium thermically therein to render said coating reflecting.

9. A reflecting element for oscillographs comprising an annular supporting member of cast insulating material, a film of cellulosic material having a thickness of less than one one-thousandth of a millimeter carried by said annular member and a reflecting coating of an electrical conducting substance covering said film.

10. A reflecting element for oscillographs comprising an annular supporting member of cast insulating material, a film of cellulosic material having a thickness of less than one one-thousandth of a millimeter carried by said annular member, and a thin coating of magnesium covering said film acting as a reflecting surface.

In testimony whereof, I have signed my name to this specification at Paris, France, this 18th day of February, 1928.

FERNAND HOLWECK.